United States Patent [19]

Bedell et al.

[11] 4,030,125

[45] June 14, 1977

[54] AUTOMATIC VIDEO PROCESSING FOR HIGH-PERFORMANCE CRT DISPLAYS

[75] Inventors: Robert J. Bedell, Arlington, Tex.; Richard E. Franseen, Springfield, Va.

[73] Assignee: The United States of America as represented by the Secretary of the Army, Washington, D.C.

[22] Filed: Dec. 16, 1976

[21] Appl. No.: 751,296

[52] U.S. Cl. ............................................. 358/169
[51] Int. Cl.² ........................................ H04N 5/14
[58] Field of Search ........................... 358/160, 169

[56] References Cited

UNITED STATES PATENTS

| | | | |
|---|---|---|---|
| 3,790,706 | 2/1974 | Gubala et al. | 358/169 |
| 3,914,545 | 10/1975 | Engel | 358/169 |

Primary Examiner—John C. Martin
Assistant Examiner—Aristotelis M. Psitos
Attorney, Agent, or Firm—Nathan Edelberg; Aubrey J. Dunn; Robert P. Gibson

[57] ABSTRACT

An automatic video processor for high-performance cathode ray tube displays incorporating an automatic gain control circuit for maintaining the black and white levels of a scene constant and at respective maximums for providing the best possible displayed imaginary without manual adjustment.

4 Claims, 3 Drawing Figures

AUTOMATIC VIDEO PROCESSING FOR HIGH-PERFORMANCE CRT DISPLAYS

The invention described herein may be manufactured, used, and licensed by the U.S. Government for governmental purposes without the payment of any royalties thereon.

BACKGROUND OF THE INVENTION

In the video processor art relating to cathode ray tube (CRT) display devices, the maintenance of good definition during constant scene changes with varying black-white contrasts have consistently plagued the users. Constant manual adjustments have been necessary for maintaining good contrast between the black and white levels for any specific viewing condition due to the variance in an individual viewer's eye as well as varying ambient viewing conditions of a changing scene.

The standard monochrome video processor has two controls, brightness and contrast. These controls must be used together when adjusting the displayed image. Brightness is controlled by adjusting the DC bias of the G1 to cathode voltage. The contrast is controlled by changes in the AC gain of the displayed video signal. Variations in the contrast affect both the broad area highlights as well as the broad dark areas. Also, fluctuations in the input signal will not be compensated in the displayed picture without adjustment of both brightness and contrast controls. The optimum picture should always contain a true black, not a gray shade as the minimum displayed brightness level.

SUMMARY OF THE INVENTION

The new automatic processor overcomes the deficiencies in the standard processor, namely the lack of a true black level and non-compensation for input signal fluctuations. The new processor incorporates an automatic gain control (AGC) circuit to compensate for input signal fluctuation and a black level clamping circuit such that the minimum signal is displayed as black. A white level control is used to adjust the broad area highlights while the minimum signal level remains displayed as black under all setting of white level control. A black level control is used to clip the video signal and establish a threshold level of the displayed signal which renders the scheme useful for background suppression in thermal (Far Infrared) imaging systems. The minimum signal after clipping will be displayed as black. The brightness level of the broad area highlights will remain unchanged.

Once the operator adjusts the respective white and black levels for his own specific eye conditions and ambient scene conditions then no further adjustments are necessary by the operator. As the scene changes, the AGC circuit eliminates the need for the operator to readjust the black and white level controls with the darkest part of the scene always being black and the brightest always white.

BRIEF DESCRIPTION OF THE DRAWINGS

The exact nature of this invention will be readily apparent from consideration of the following specification relating to the annexed drawings, wherein.

DETAILED DESCRIPTION OF THE INVENTION

Figure 1:
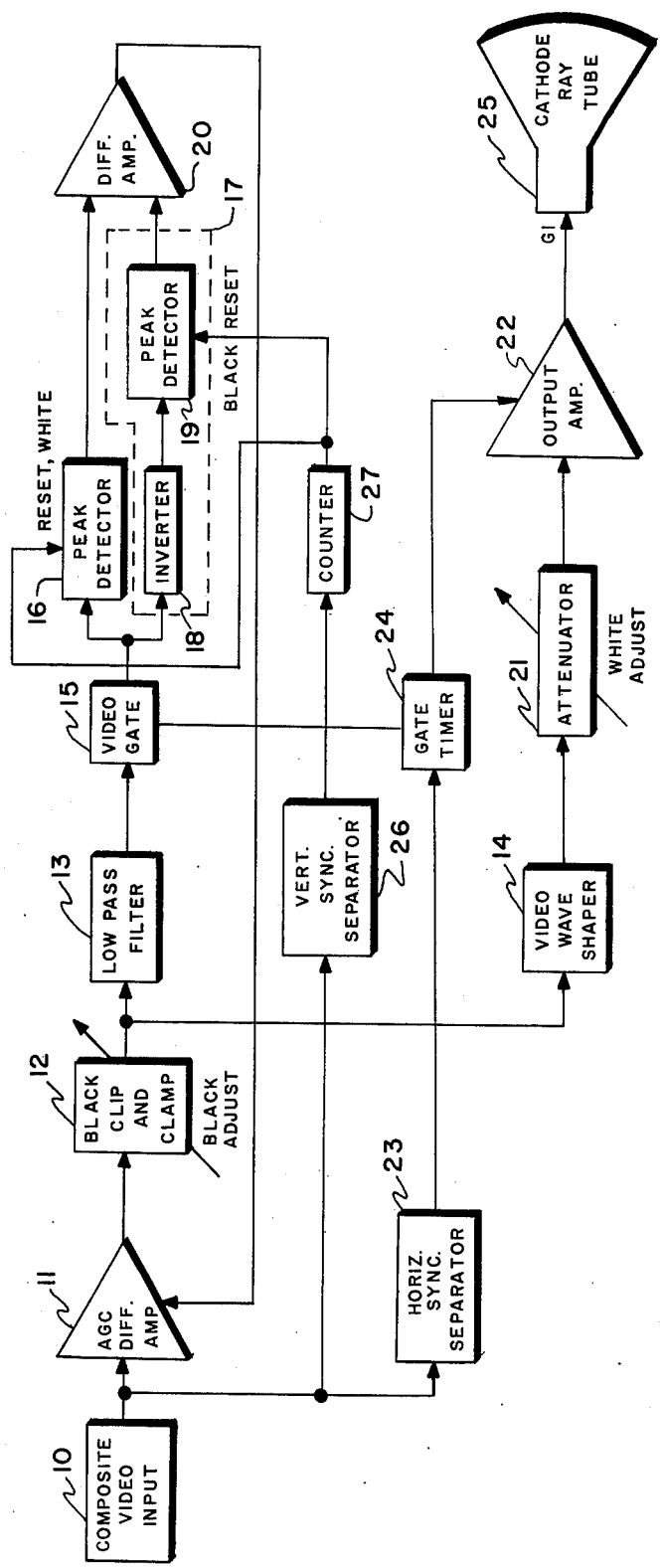
FIG. 1 is a block diagram of one embodiment of an automatic video processor.

The invention may perhaps be best understood by referring to the drawings, in which FIG. 1 shows an input from composite video input 10 applied to one input of AGC differential amplifier 11. The output of 11 is applied to an adjustable clip and clamp circuit 12 whereby black level of the CRT may be adjusted; this circuit clips the black of incoming video signals and clamps the minimum of the video signals to a black reference level, such as the blanking level. The output of 12 is applied both to low-pass filter 13 and video wave shaper 14. Low-pass filter 13 has a $0.4MH_z$ cutoff and eliminates small area signals, such as point sources and noise, and prevents their being detected as minimum or maximum signal valves. Video wave shaper 14 performs such conventional tasks as peak clipping, gamma control, bandwidth control, and aperture control. The output of filter 13 feeds through video gate 15 to resettable peak (white) detector 16 and resettable minimum (black) detector 17. As can be seen, black detector 17 includes inverter 18 and peak detector 19. The outputs of detectors 16 and 17 are fed as inputs to differential amplifier 20; this amplifier senses the difference between the white level and the black level in the video signal and feeds a gain control signal to AGC differential amplifier 11.

The output of video wave-shaper 14 feeds through adjustable attenuator 21 to gated video output amplifier 22. Attenuator 21 allows manual adjustment of the white level of the video signal to amplifier 22 which also restores the DC level.

Operation of video gate 15 and output amplifier 22 is controlled by sync separator 23 and gate timer 24. Separator 23 is a conventional horizontal sync pulse detector and gate timer 24 may be a Schmitt trigger or equivalent. Timer 24 turns on gate 15 and amplifier 22 during the active time of the incoming video signal, i.e., 15 and 22 are off during horizontal and vertical blanking intervals. Thus, detectors 16 and 17 only examine the actual picture information for the CRT. The output of amplifier 22 feeds the G1 terminal of CRT 25. Resettable detectors 16 and 19 may be sample-and-hold circuits which sample video for a complete picture frame. There detectors are reset by a circuit including vertical sync separator 26 and counter 27. The separator 26 separates vertical pulses, and the counter provides an output pulse for every two vertical sync pulses (assuming an interlaced picture).

Figure 2:
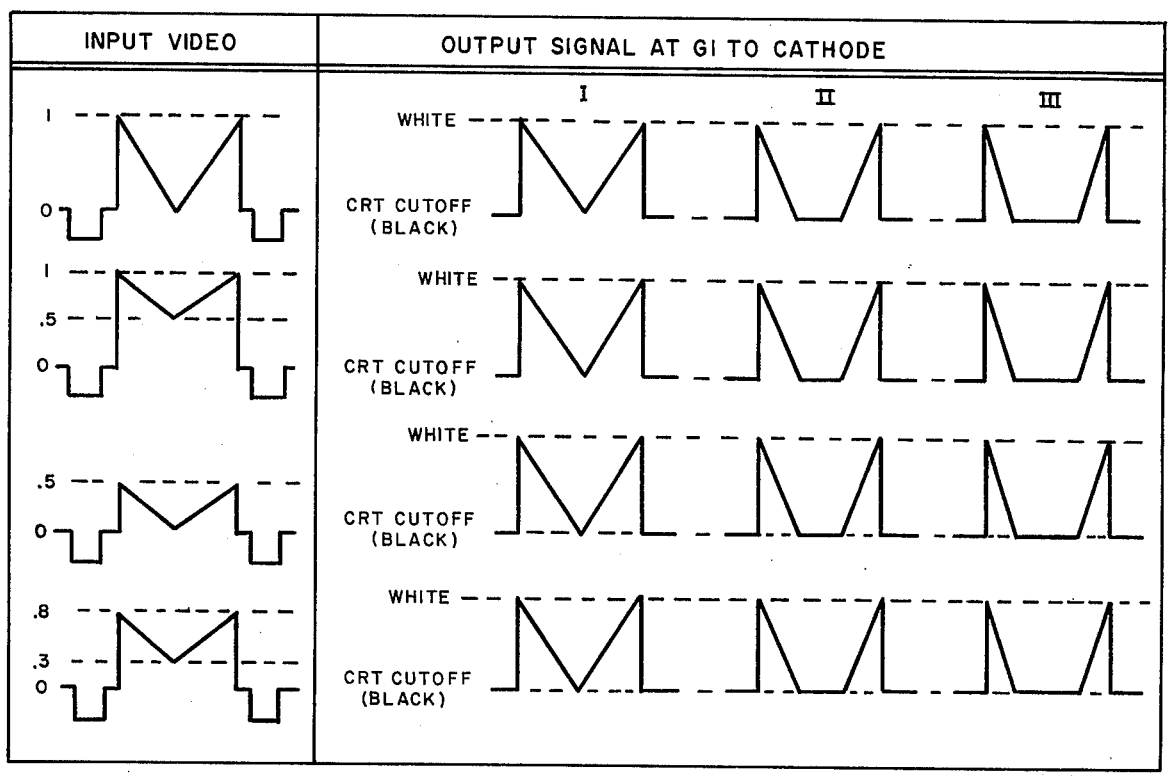
FIG. 2 shows illustrative cases for AGC black level control.

FIG. 2 shows waveforms for particular video inputs, and how such inputs are handled by the FIG. 1 circuit. The right side of FIG. 2 shows the output of amplifier 22 for three different settings of black adjustment at black clip and clamp 12, with white adjust at attenuator 21 fixed. The input signal is a composite video containing sync pulses. As can be seen from FIG. 2, the output signal at G1 to cathode is the same regardless of variations in the input signal peak to peak and DC level fluctuations for any black level setting. The signal at the CRT is always between CRT cutoff and white level, never between a gray shade and white. Each of the four input video signals are shown as illustrative of various peak to peak and DC level variations and serve to show that the specific circuit of FIG. 1 will maintain a constant output signal at G1 to cathode under all conditions, thus automatically compensating for fluctuations in the incoming video signal and always displaying a constant black-to-white picture.

Figure 3:
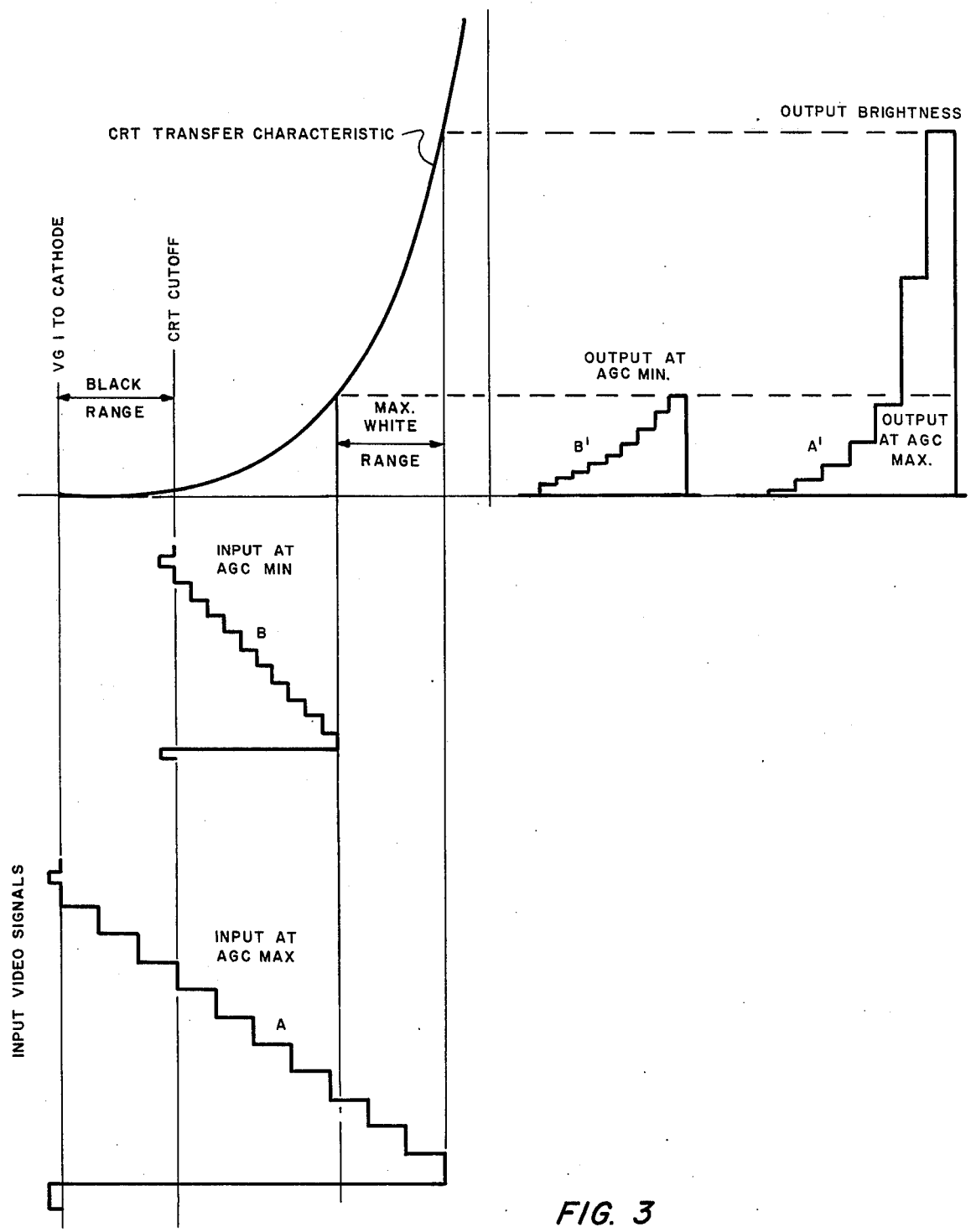
FIG. 3 shows the transfer characteristics of a cathode ray tube under various operating conditions.

FIG. 3 shows a typical CRT transfer characteristic with two different signals applied to the CRT. Signal A is with the black level control not clipping any at the video and with the white level control at a minimum. Signal B has the black level control clipping at its maximum and the white level control also at its maximum. Respective displayed output A and B show that the minimum signal is always black.

While a specific embodiment of the invention has been shown and described, other embodiments may be obvious to one skilled in the art. For example, counter 27 may be a divider having a factor or two. Alternatively, a dividor or counter might be connected to the output of separator 23 and divide (counter) by the number of lines in a frame. The output of such a dividor or counter could directly feed reset inputs of detectors 16 and 19.

We claim:

1. A video processor including a gain-controlled amplifier having a composite video input, a control input, and an output; an adjustable clipper-clamper having an output and having an input connected to said output of said amplifier; a video gate having a control input, a video input, and a video output; a resettable peak video signal detector having an output and a reset input, and having a signal input connected to said video output of said gate; a resettable minimum video signal detector having an output and a reset input and having an input connected to said video output of said gate; a difference detector having an output and having individual inputs connected to said outputs of said peak and minimum video signal detectors, said difference detector output being connected to said control input of said gain-controlled amplifier; video waveshaping means having an input connected to said output of said clipper-clamper and having an output; a gated video output amplifier having a gain input, a video input, and an output; gate control means having a composite video input and having an output connected to said gate inputs of said video gate and said gated video output amplifier; detector reset means having a composite video input and having an output connected to said reset inputs of said detectors; and a cathode ray tube having a video input terminal connected to said output of said video output amplifier.

2. The processor as recited in claim 1 wherein said gate control means includes a horizontal sync separator having an input and an output; and a gate timer having an input connected to said output of said separator and having an output; wherein said input of said separator and said output of said gate timer respectfully correspond to said composite video input and to said output of said gate control means.

3. The processor as recited in claim 1 wherein said detector reset means includes a horizontal sync separator having an input and an output; and a counter having an input connected to said output of said separator and having an output; wherein said input of said horizontal sync separator and said output of said counter respectfully correspond to said composite video and said output of said detector reset means.

4. The processor as recited in claim 2 wherein said detector reset means includes a horizontal sync separator having an input and an output; and a counter having an input connected to said output of said separator and having an output; wherein said input of said horizontal sync separator and said output of said counter respectfully correspond to said composite video and said output of said detector reset means.

* * * * *